United States Patent
Dölling et al.

(10) Patent No.: US 6,786,507 B2
(45) Date of Patent: Sep. 7, 2004

(54) HYBRID GAS GENERATOR

(75) Inventors: Uwe Dölling, Ampfing (DE); Maximilian Bergmann, Schwindegg (DE); Alexander Gerstner, Waldkraiburg (DE); Werner Zengerle, Reaensburg (DE); Lorenz Seidl, Waldkraiburg (DE)

(73) Assignee: TRW Airbag Systems GmbH & Co. KG, Aschau (DE)

( * ) Notice: Subject to any disclaimer, the term of this patent is extended or adjusted under 35 U.S.C. 154(b) by 20 days.

(21) Appl. No.: 10/235,318

(22) Filed: Sep. 5, 2002

(65) Prior Publication Data

US 2003/0042720 A1 Mar. 6, 2003

(30) Foreign Application Priority Data

Sep. 5, 2001 (DE) .................................. 201 14 664 U

(51) Int. Cl.⁷ .......................... B60R 21/26; B60R 21/16
(52) U.S. Cl. ................... 280/737; 280/741; 137/68.19; 137/68.21; 137/68.23
(58) Field of Search ................. 280/737, 741, 280/742; 137/68.19, 68.21–68.23, 68.25, 68.27, 68.28; 222/3, 5; 102/530, 531; 220/89.2

(56) References Cited

U.S. PATENT DOCUMENTS

| 3,567,245 A | | 3/1971 | Ekstrom |
| 5,002,085 A | | 3/1991 | FitzGerald |
| 5,615,912 A | * | 4/1997 | O'Loughlin et al. ......... 280/737 |
| 5,664,804 A | * | 9/1997 | Saccone ...................... 280/737 |
| 6,042,146 A | | 3/2000 | Bauer et al. |
| 6,062,599 A | * | 5/2000 | Forbes et al. ................ 280/737 |
| 6,168,202 B1 | * | 1/2001 | Stevens ....................... 280/737 |
| 6,217,065 B1 | * | 4/2001 | Al-Amin et al. ............ 280/737 |
| 6,382,668 B1 | * | 5/2002 | Goetz ......................... 280/737 |
| 6,412,811 B1 | * | 7/2002 | Campbell et al. ......... 280/730.2 |

FOREIGN PATENT DOCUMENTS

DE 19545494 A1 6/1997

* cited by examiner

Primary Examiner—Ruth Ilan
(74) Attorney, Agent, or Firm—Tarolli, Sundheim, Covell, & Tummino L.L.P.

(57) ABSTRACT

A hybrid gas generator comprises a chamber that contains pressurized fluid and that is sealed off by a rupturable membrane, and a pyrotechnical propellant charge that ruptures the membrane when it is ignited. The gas generator further comprises a nozzle wall that is arranged between the propellant charge and the membrane and that has at least one passage opening through which combustion products generated upon ignition of said pyrotechnical propellant charge flow towards the membrane. The passage opening has such a shape and is oriented with respect to the membrane in such a way that, when the membrane is ruptured, there are formed sections of said membrane that remain all connected to an edge of the membrane.

13 Claims, 2 Drawing Sheets

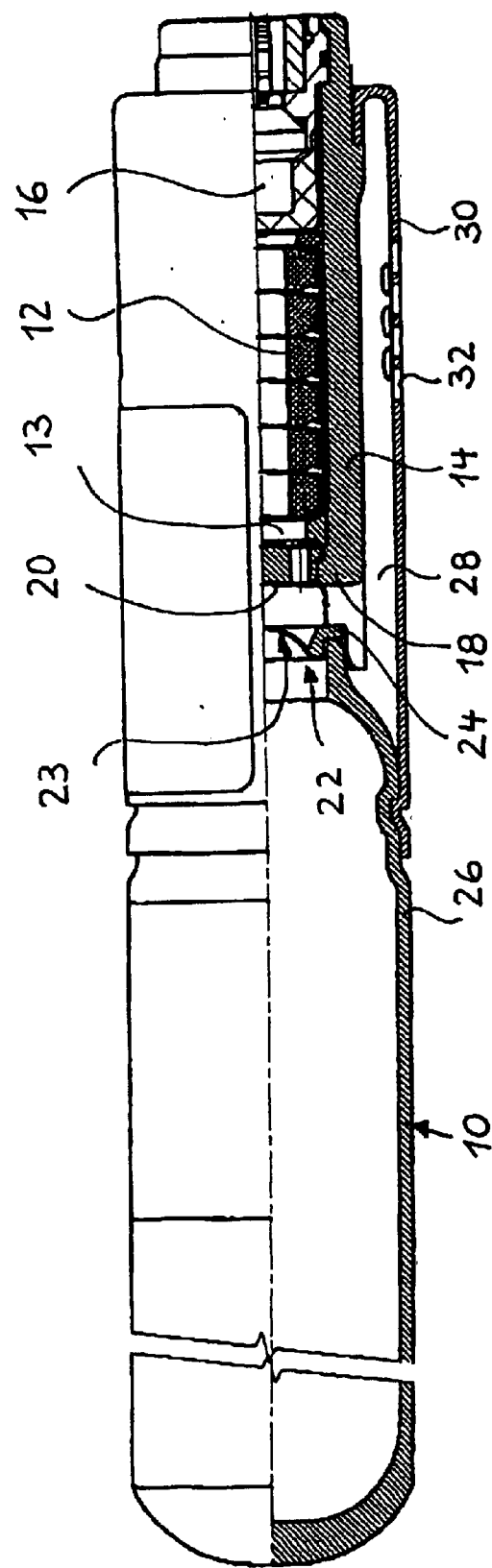

HYBRID GAS GENERATOR

TECHNICAL FIELD

The invention relates to a hybrid gas generator.

BACKGROUND OF THE INVENTION

Conventional hybrid gas generators comprise a chamber that contains pressurized fluid and that is sealed off by a rupturable membrane, a pyrotechnical propellant charge that ruptures the membrane when it is ignited, and a nozzle wall that is arranged between the propellant charge and the membrane and that has at least one passage opening through which the combustion products generated upon ignition of the pyrotechnical propellant charge flow towards the membrane.

These hybrid gas generators normally operate with pressurized gas which, when it flows out, mixes with the hot combustion products of the propellant charge. The resultant mixed gas then enters a restraint means, for example, an airbag or a chamber of an actuator to actuate a vehicle occupant restraint system. The passage openings in the nozzle wall have the task of aiming the generated flow of combustion products precisely at the membrane in order to break it open. as quickly as possible. Until now, arched passage openings arranged along a circle have been arranged uniformly and at close distances from each other, so that a circular disk is separated from the membrane by the combustion products. The advantage of such an arrangement is that a very large opening is made in the membrane very quickly and, consequently, a large volume of pressure fluid can escape from the chamber very quickly. The so-called resultant freed sections of the membranes are those sections that do not remain attached to the edge of the membrane but rather that are entrained with the fluid and gas flow and that enter a downstream filter, which they partially clog. The edge of the membrane can also be formed by a ring-shaped holding ring that is connected in once piece with the membrane skin to form a prefabricated unit.

BRIEF SUMMARY OF THE INVENTION

The invention offers the possibility to build a smaller and lighter hybrid gas generator that has high capacity. According to the invention, a hybrid gas generator comprises a chamber that contains pressurized fluid and that is sealed off by a rupturable membrane, and a pyrotechnical propellant charge that ruptures the membrane when it is ignited. The gas generator further comprises a nozzle wall that is arranged between the propellant charge and the membrane and that has at least one passage opening through which combustion products generated upon ignition of said pyrotechnical propellant change flow towards the membrane. The passage opening has such a shape and is oriented with respect to the membrane in such a way that, when the membrane is ruptured, there are formed sections of said membrane that remain all connected to an edge of the membrane. Whereas the state of the art purposefully endeavors to make the largest possible opening in the membrane, creating at least one freed section that is no longer connected to the edge, the invention takes a different approach. According to the invention, no such freed sections are created any more but rather, due to the special arrangement and geometry of the passage opening or several passage openings, sections of the membrane are formed that remain all connected to the edge of the membrane which anyway is permanently attached to a stationary wall inside the gas generator. Since no free segments of the membrane are formed, the filter normally provided can be designed so as to be much less powerful or, as the invention preferably proposes, it can be dispensed with entirely. Even a less powerful, wider-meshed filter saves weight and space; by dispensing with the filter, it is even possible to do entirely without filter chamber, which had been provided until now.

Due to the arrangement and geometry of the passage opening, preferably a center section is separated from the membrane, which remains connected to the edge of the membrane via a bridge or a web (an area not subjected to the blast of combustion products). The center section then swings towards the outside when it is opened, without being entrained by the fluid flow or by the flow of combustion products.

Preferably several arched or ring-segment-shaped passage openings are provided which are adjacent to each other in the circumferential direction, at least two of which are at such a large distance from each other that a center section separated from the membrane remains connected to the edge of the membrane via a web.

The web is preferably formed in that, relative to the center of the membrane, there is no passage opening in an area enclosing an angle from 80° to 120°. Consequently, in this area, no combustion products flow directly against the membrane, which remains intact in this section.

Another embodiment provides for the passage opening to be star-shaped. Due to the star-shaped design, the membrane is first opened in the center and then tears open radially toward the outside, which allows a fast opening procedure.

Preferably, the radial sections have a decreasing width towards their radially outer ends. As a result, a larger quantity of the combustion products will strike the membrane in the area of the center of the star and lead to a fast opening there. A delay of the opening procedure towards the edge is not to be expected, in spite of the decreasing width of the radial sections, since the pressure of the fluid additionally enhances the tearing open of the membrane as soon as it has been opened in the center.

According to the preferred embodiment, a total of three radial sections is provided, which are at a uniform distance from each other along the circumference. Since only three sections form the passage opening, relatively large sections of the membrane are formed, which remain attached to the edge over a large angle range.

Preferably, the propellant charge is situated outside of the chamber, whereby additionally there is a shared outflow chamber for pressurized gas and combustion products in which chamber they are mixed with each other. This outflow chamber can have a small volume.

The pressure fluid is preferably pressurized gas and the gas generator according to the invention preferably does not have a filter.

The nozzle wall is formed by a disk-shaped insert that is manufactured separately and that forms the front wall of a combustion chamber wall.

BRIEF DESCRIPTION OF THE DRAWINGS

FIG. 1 is a longitudinal sectional view through a gas generator according to the invention;

DETAILED DESCRIPTION OF THE PREFERRED EMBODIMENTS

Figure 2A:
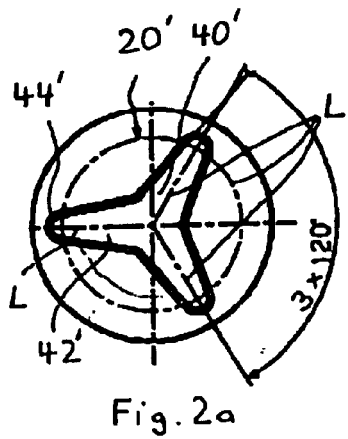
FIGS. 2a and 2b are a top view and a perspective view of a first embodiment of the insert that can be used with the gas generator according to the invention.

FIG. 1 shows a hybrid gas generator that has an elongated, cylindrical shape. At one axial end, there is a chamber 10 filled with pressurized gas and, at the opposite end, there is a combustion chamber 13 that is filled with a pyrotechnical propellant charge 12 and that is delimited by a combustion chamber wall 14. An igniter 16 serves to ignite the pyrotechnical propellant charge 12. The front wall 18 of the combustion chamber 13, which faces the chamber 10, is made up of a disk-shaped insert 20 that is manufactured as a separate part and that is connected to the rest of the combustion chamber wall 14, for example, by welding.

Opposite the insert 20, there is a disk-shaped membrane 22 that is somewhat larger than the insert 20 and that closes off the chamber 10 in a pressure-tight fashion. The membrane 22 consists of a thin skin 23 and of a holding ring connected thereto, which forms the edge 24 of the membrane. The membrane 22 is permanently attached, preferably by means of welding, to the edge 24 on the wall 26 of the chamber 10. Radially outside of the combustion chamber 13, there is an outflow chamber 28 that is delimited by an outer housing 30. The outer housing 30 has several large outlet openings 32 through which, as will be explained below, the released gas can flow into an airbag, not shown here. As can be seen, the hybrid gas generator does not have a filter; the outlet openings 32 are so large that they would not be able to hold back any combustion products or other particles that are released when the gas generator is activated.

When the propellant charge 12 burns, the membrane 22 is opened in a predefinable manner by the generated combustion products. For this purpose, there are one or more passage openings in the insert 20 which form nozzles that specifically direct the flow of combustion products to narrow areas of the membrane 22 in order to open it along a line in these areas. In FIG. 1 there can be seen that the membrane is destroyed by a gas jet which affects said membrane from outside. The passage openings are not realized as circular holes, but have an elongated shape which is adapted to the respective tear line 45', 45", 45'". The elongate openings are extending along lines L, in other words, the passage openings are slot-like openings. The nozzles formed by the passage openings in the insert 20 constitute a constriction between the pyrotechnical charge 12 and the membrane 22.

The insert 20, which is designated more generally as a nozzle wall, is shown in different variants in FIGS. 2a through 4d.

Figure 2B:
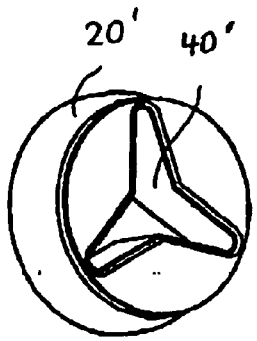
Figure 2C:
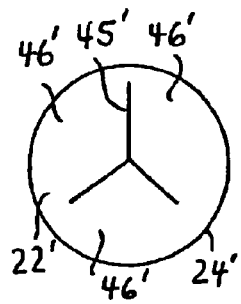
FIG. 2c is a top view of the membrane with a tear line that is formed by the insert according to FIGS. 2a and 2b.

According to the variant in FIGS. 2a and 2b, the insert 20' has a star-shaped passage opening 40' with three radial sections 42' that are uniformly spaced along the circumference. The mid-point of the star-shaped passage opening 40' coincides with the middle axis of the disk-shaped insert 20'. Towards their radially outer ends 44', the three radial sections 42' each have a continuously decreasing width as measured in the circumferential direction.

The pyrotechnical propellant charge 12 is ignited when the igniter 16 is activated and the resultant combustion products leave the combustion chamber via the passage opening 20' as a star-shaped jet and immediately strike the membrane 22'. The membrane 22' is first ruptured in the center by the combustion products. The further opening of the membrane 22' takes place along the radial sections 42'. The membrane 22' thus receives star-shaped tear lines 45' (see FIG. 2c), so that three sections 46' of the membrane are formed which, however, remain connected at their radial outer ends to the edge 24' of the membrane when they swing in the direction of the combustion chamber after being ruptured by the escaping gas. No so-called freed sections are formed that are entrained with the gas flow.

Figure 3A:
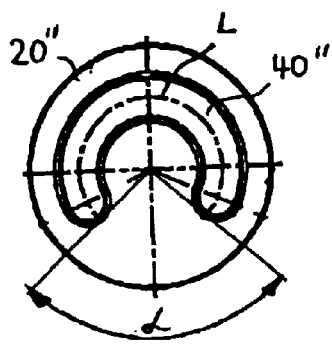
FIGS. 3a and 3b are a top view and a perspective view of a second embodiment of the insert that can be used with the gas generator according to the invention.

In the embodiment according to FIG. 3a, a passage opening 40" is provided that extends parallel to the edge 24" of the membrane 22" and that describes an open ring segment extending over 250° so that, in an angle area □ of about 110°, relative to the center of the insert 20", there is no passage opening 40". When the membrane 22" is opened, a disk-shaped center section 52" is separated from the membrane (FIG. 3c), and this section remains attached to the edge 24" via a web 54" when pressurized gas flows out of the chamber 10.

Figure 3B:
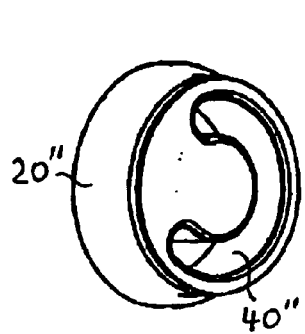
Figure 3C:
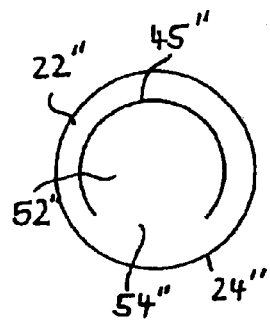
FIG. 3c is a top view of the membrane with a tear line that is formed by the insert according to FIGS. 3a and 3b.
Figure 4A:
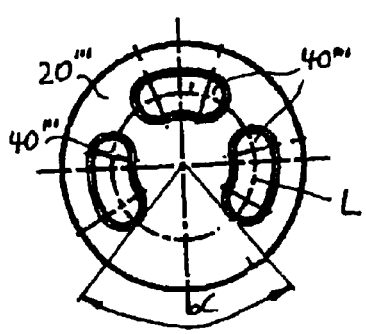
FIGS. 4a and 4b are a top view and a perspective view of a third embodiment of an insert that can be used with the gas generator according to the invention.
Figure 4B:
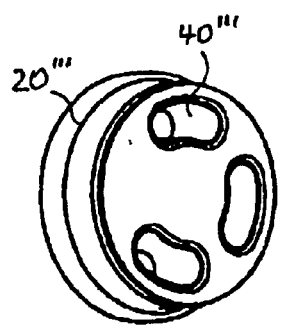
Figure 4C:
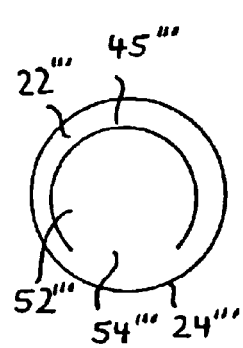
FIG. 4c is a top view of the membrane with a tear line that is formed by the insert according to FIGS. 4a and 4b.

Instead of one long, continuous ring-segment-shaped passage opening, there may also be provided several circumferentially adjacent, arched or shorter ring-segment-shaped passage openings 40'" according to FIG. 4a by which, like in FIGS. 3a through 3c, a disk-shaped center section 52'" is cut out of the membrane 22'", the section remaining attached to the edge 24'" via a web 54'" (FIG. 4c). With this embodiment as well, there is no passage opening 40'" in an area enclosing an angle □ between 80° and 120°, in order to create an adequately wide web 54'".

The pressurized gas flowing out of the chamber 10 mixes in the outflow chamber 28 with the hot combustion products (preferably only hot gas without hot particles) and flows out via the outlet openings 32.

The membrane 22', 22", 22'" has no predefined tear lines formed by a reduced wall strength as is sometimes called for in the state of the art. Consequently, the membrane 22', 22", 22'" is less expensive to manufacture and has a high stability.

From the above description of the invention, those skilled in the art will perceive improvements, changes and modifications in the invention. Such improvements, changes and modifications within the skill of the art are intended to be covered by the appended claims.

What is claimed is:

1. A hybrid gas generator comprising:
   a chamber that contains pressurized fluid and that is sealed off by a rupturable membrane,
   a pyrotechnical propellant charge that ruptures said membrane when it is ignited, and
   a nozzle wall that is arranged between said propellant charge and said membrane and that has at least one passage opening through which combustion products generated upon ignition of said pyrotechnical propellant charge flow towards said membrane,
   wherein the improvement consists in that
      said passage opening has such a shape and is oriented with respect to said membrane in such a way that, when said membrane is ruptured, there are formed sections of said membrane that remain all connected to an edge of said membrane,
      said passage opening being an open ring segment so that a center section is separated from said membrane and said section remains connected to said edge of said membrane via a web.

2. The hybrid gas generator according to claim 1, wherein said passage opening runs essentially parallel to said edge of said membrane.

3. The hybrid gas generator according to claim 1, wherein several ring-segment-shaped passage openings are provided which are adjacent to each other in a circumferential direction, at least two of which are at such a large distance from each other that a center section separated from said membrane remains connected to said edge of said membrane via said web.

4. The hybrid gas generator according to claim 3, wherein said web is formed in that, relative to a center of said membrane, there is no passage opening in an area enclosing an angle from 80° to 120°.

5. A hybrid gas generator comprising:
   a chamber that contains pressurized fluid and that is sealed off by a rupturable membrane,
   a pyrotechnical propellant charge that ruptures said membrane when it is ignited, and
   a nozzle wall that is arranged between said propellant charge and said membrane and that has at least one star-shaped passage opening through which combustion products generated upon ignition of said pyrotechnical propellant charge flow towards said membrane,
   wherein the improvement consists in that
      said passage opening has such a shape and is oriented with respect to said membrane in such a way that, when said membrane is ruptured, there are formed sections of said membrane that remain all connected to an edge of said membrane.

6. The hybrid gas generator according to claim 5, wherein radial sections of said star-shaped passage opening have a decreasing width towards their radially outer ends.

7. The hybrid gas generator according to claim 6, wherein said star-shaped passage opening has a total of three radial sections which are at a uniform distance from each other along said circumference.

8. A hybrid gas generator comprising:
   a chamber that contains pressurized fluid and that is sealed off by a rupturable membrane,
   a pyrotechnical propellant charge that ruptures said membrane when it is ignited, and
   a nozzle wall that is arranged between said propellant charge and said membrane and that has at least one passage opening through which combustion products generated upon ignition of said pyrotechnical propellant charge flow towards said membrane,
   wherein the improvement consists in that
      said passage opening has such a shape and is oriented with respect to said membrane in such a way that, when said membrane is ruptured, there are formed sections of said membrane that remain all connected to an edge of said membrane,
      said passage opening being elongated in a direction perpendicular to flow of said combustion products.

9. The hybrid gas generator according to claim 8, wherein said propellant charge is situated outside of said chamber and wherein a shared outflow chamber for pressurized fluid and said combustion products is provided, in which chamber they are mixed with each other.

10. The hybrid gas generator according to claim 8, wherein said pressurized fluid is pressurized gas.

11. The hybrid gas generator according to claim 8, wherein said hybrid gas generator does not have a filter.

12. The hybrid gas generator according to claim 8, wherein said nozzle wall is a disk-shaped insert that forms a front wall of a combustion chamber wall.

13. The hybrid gas generator according to claim 8 wherein said passage opening is non-cylindrical.

* * * * *